United States Patent [19]

Dequasie

[11] 4,317,159
[45] Feb. 23, 1982

[54] AC CAPACITOR AND IMPREGNANT THEREFOR

[75] Inventor: Andrew Dequasie, Pownal, Vt.

[73] Assignee: Sprague Electric Company, North Adams, Mass.

[21] Appl. No.: 101,618

[22] Filed: Dec. 10, 1979

[51] Int. Cl.$^3$ ............................................. H01G 4/22
[52] U.S. Cl. .................................... 361/318; 252/575;
252/576; 252/578; 361/319; 361/327
[58] Field of Search ............... 361/315, 318, 319, 327;
252/63.7, 567, 575, 576, 578

[56] References Cited

U.S. PATENT DOCUMENTS

| | | | |
|---|---|---|---|
| 2,593,829 | 4/1952 | Arledter | 175/41 |
| 2,806,190 | 9/1957 | Robinson | 252/63.7 UX |
| 3,420,778 | 1/1969 | Heidt | 361/319 X |
| 3,466,314 | 9/1969 | Moedritzer | 252/63.7 X |
| 3,987,348 | 10/1976 | Flanagan | 317/259 |
| 4,019,996 | 4/1977 | Jay | 252/63.7 |
| 4,060,583 | 11/1977 | Groves | 252/63.7 X |
| 4,142,223 | 2/1979 | Shaw | 361/315 X |

FOREIGN PATENT DOCUMENTS

| | | |
|---|---|---|
| 640983 | 5/1962 | Canada . |
| 1039643 | 9/1958 | Fed. Rep. of Germany ...... 252/576 |
| 1350089 | 4/1974 | United Kingdom . |
| 1482587 | 8/1977 | United Kingdom . |

*Primary Examiner*—Richard R. Kucia
*Attorney, Agent, or Firm*—Connolly and Hutz

[57] ABSTRACT

An AC metallized film capacitor having a plurality of electrodes separated by a dielectric spacer contains as its impregnant system a dielectric fluid and 1–20% of an aliphatic or aromatic isocyanate having unreacted NCO groups to improve life characteristics.

6 Claims, 1 Drawing Figure

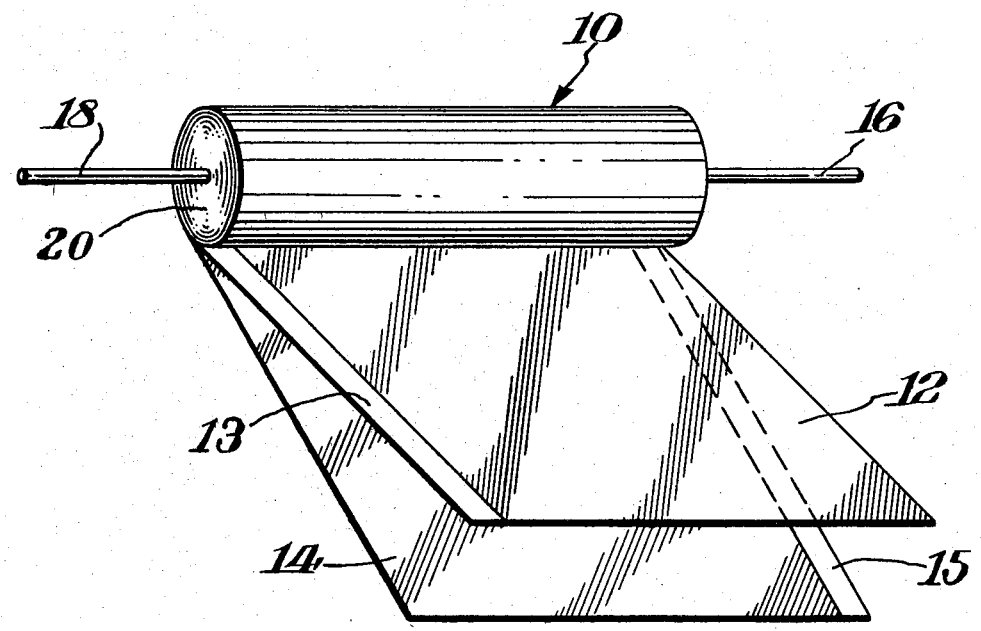

AC CAPACITOR AND IMPREGNANT THEREFOR

BACKGROUND OF THE INVENTION

This invention relates to an AC capacitor containing as its impregnant system a dielectric fluid containing an aliphatic or aromatic isocyanate to improve the life characteristics of the capacitor.

For quite a while, dielectric fluid impregnated capacitors used polychlorinated biphenyls or PCB's. Environmental concerns have caused a reduction in their usage, and non-halogenated organic liquids are being used more frequently. Some of these non-halogenated materials are ester-based fluids, frequently stabilized by epoxides. Even if these liquids are stabilized, e.g., against hydrolysis, metallized AC capacitors impregnated with them show a capacitance loss on life testing. This loss may be caused by corona, traces of water or acids, or incomplete impregnation of wound sections.

SUMMARY OF THE INVENTION

It is an object of this invention to provide an AC capacitor utilizing a dielectric fluid with improved life characteristics or allowing higher operating voltages.

These features are attained in this invention by using an aliphatic or aromatic isocyanate with unreacted NCO groups as an additive in the dielectric fluid.

The actual mechanism of the isocyanate additive is not known. Since these materials are imperfect insulators, it would appear that their presence may allow any charge which might build up in a capacitor on the edges of the foil or metallized film to be bridged and leak off rather than accumulating, and thus may increase the life and perhaps corona start voltages of the capacitor.

The isocyanates also appear to scavenge trace amounts of water and acids and react with them releasing carbon dioxide that is either evacuated during vacuum impregnation or is present in small enough amounts to cause no observable harmful effect. The isocyanate would also react with water, active hydrogen, or residual alcohol. Most likely, the unreacted isocyanate scavenges any water, acid, alcohol, and/or hydrogen present, accounting for the reduced loss of capacitance on AC life test of metallized capacitors.

All isocyanates tried were effective in reducing capacitance loss of metallized capacitors on AC life test. The choice of isocyanate will generally be governed by considerations of safety, solubility in the primary impregnant, and other electrical properties.

The dielectric fluids generally used in AC capacitors are ester-based fluids such as 2-ethyl-hexylphthalate or diisononylphthalate, and aromatic hydrocarbons such as isopropyl biphenyl or phenyl xylyl ethane. An epoxide is usually present as a stabilizer, particularly with the two phthalates.

The metallized capacitors that utilize the dielectric fluid containing the isocyanate utilize film separators rather than paper. The isocyanate additive has been used in non-metallized capacitors, but, since the relatively massive foil electrodes in these are not destroyed as easily as metallized ones are, the effect on capacitance loss is not as apparent. However, an improvement would be expected by use of an isocyanate additive in metallized kraft paper capacitors.

BRIEF DESCRIPTION OF THE DRAWING

The sole FIGURE depicts a partly unwound capacitor section in which the improved dielectric composition of the present invention is used as the impregnant.

DESCRIPTION OF THE PREFERRED EMBODIMENTS

Life characteristics of AC metallized film capacitors have been found to be improved through the use of a dielectric composition containing a diisocyanate. A metallized film section 10, such as is shown partly unrolled in the FIGURE, consists of two metallized-film electrodes 12 and 14 e.g., aluminized polypropylene. The electrodes 12 and 14 are provided with unmetallized margins 13 and 15, respectively, which are oppositely positioned in the winding 10 so that the metallized portion of each electrode is available for lead contact at only one edge of the winding. The ends of the wound section 10 are covered with metallic spray or solder 20, and tabs or leads 16 and 18 are connected thereby to electrodes 12 and 14, respectively. The section 10 is impregnated with the dielectric composition of the present invention preferably by vacuum impregnation methods known to the capacitor art.

Each of the following examples involves groups of aluminized polypropylene capacitors impregnated under identical conditions. All were made with 0.32 mil polypropylene which is normally rated at 330–370 V AC. Each group consisted of three capacitors, identified as follows: (A)—wound units not heat cured before impregnation, (B)—pressed oval units, and (C)—wound units heat cured before impregnation. Pressed oval units are wound on a large cylindrical mandrel, the mandrel is removed, and the wound section is pressed into an oval shape prior to the application of metal spray or solder to the ends.

The impregnants employed in the examples were diisononylphthalate (DINP), dioctyl sebacate (DIOS), diisodecyl phthalate (DIDP), a tetraester of pentaerythritol (PE), an ester of tripentaerythritol (tri-PE), dixylyl ethane (DIXE), diallylphthalate (DAP), a poly-alpha-olefin (PAO), and an aromatic-modified poly-alpha-olefin (Ar-PAO).

The isocyanate additives in the examples are stock products characterized as: a C-36 aliphatic diisocyanate with 14% free isocyanate (ADI), a polymethylene polyphenyl isocyanate with 31.7% free isocyanate (PPI), a diphenyl methane diisocyanate with 33.4% free isocyanate (MDI), a diphenyl methane diisocyanate prepolymer with 7–9% free isocyanate (MDIP), a diisocyanate prepolymer mixture free of toluene diisocyanate (DPP), and a liquid rincinoleate urethane prepolymer (RUP) containing diphenyl methane diisocyanate and higher polymers consistent with polymethylene polyphenyl isocyanate averaging three aromatic groups per molecule.

In the following examples, life test data showing capacitance loss as a percent of capacitance change (%ΔC) are presented for various impregnants with and without isocyanate addition. In Examples 1 through 4, the life tests were carried out at 500 V, 80° C., and 60 Hz. In all these examples, isocyanate addition improved capacitance loss.

EXAMPLE 1

In this series of tests, various impregnants with and without liquid rincinoleate urethane prepolymer (RUP)

were tested for 2000 hrs in units that were not heat cured before impregnation (A) and pressed oval units (B). Capacitance readings were taken at 250 hrs, 500 hrs, 1000 hrs, 1500 hrs, and 2000 hrs; capacitance loss is reported as a percent change (%ΔC).

| Impregnant System | Unit Type | % Δ C | | | | |
|---|---|---|---|---|---|---|
| | | 250 hrs | 500 hrs | 1000 hrs | 1500 hrs | 2000 hrs |
| DIOS | A | 4.6 | 15.6 | 54.1 | — | — |
| | A | 4.5 | 15.2 | 48.9 | — | — |
| | B | 3.0 | 13.5 | 27.5 | — | — |
| tri-PE | A | 2.8 | 7.1 | 13.0 | 17.2 | — |
| | A | 3.1 | 9.8 | 16.7 | 24.2 | — |
| | B | 2.2 | 7.0 | 15.5 | 22.4 | 28.5 |
| tri-PE + 10% DAP | A | 2.3 | 5.9 | 10.6 | 14.3 | 18.2 |
| | A | 2.5 | 6.4 | 12.2 | 16.5 | 23.3 |
| | B | 1.5 | 3.6 | 8.5 | 13.3 | 20.5 |
| DINP + 20% RUP | A | 0.8 | 1.2 | 1.4 | 1.6 | 1.7 |
| | A | 0.7 | 1.1 | 1.4 | 1.7 | 1.8 |
| | B | 0.8 | 0.7 | 0.9 | 1.0 | 1.0 |
| DINP + 20% DAP | A | 2.3 | 5.0 | 10.2 | 15.6 | 39.8 |
| | A | 2.3 | 5.2 | 10.7 | 15.6 | 48.4 |
| | B | 1.8 | 4.2 | 8.7 | 13.1 | 20.3 |
| DINP + 10% DAP + 20% RUP | A | 0.7 | 1.1 | 1.4 | 1.8 | 2.3 |
| | A | 0.9 | 1.4 | 1.7 | 2.0 | 2.5 |
| | B | 0.5 | 0.4 | 0.6 | 0.7 | 0.8 |
| DIPN + 10% DAP + 10% RUP | A | 1.6 | 2.3 | 3.1 | 3.4 | 3.7 |
| | A | 1.6 | 2.3 | 3.0 | 3.2 | 3.5 |
| | B | 0.1 | 0.4 | 0.7 | 0.5 | 0.6 |
| DINP + 20% RUP | A | 1.6 | 2.1 | 2.7 | 2.8 | 3.2 |
| | A | 1.3 | 2.0 | 2.6 | 2.8 | 3.2 |
| | B | 0.3 | 0.6 | — | — | — |
| PE + 10% DAP + 10% RUP | A | 1.5 | 2.3 | 3.3 | 3.8 | 4.2 |
| | A | 1.3 | 2.2 | 3.2 | 3.6 | 4.0 |
| | B | 0.3 | 0.6 | 0.8 | 0.7 | 1.0 |
| PE + 20% RUP | A | 1.0 | 1.7 | 2.6 | 3.1 | 3.6 |
| | A | 1.2 | 1.9 | 2.9 | 3.3 | 3.8 |
| | B | 0.7 | 1.0 | — | — | — |

EXAMPLE 2

In this example another series of impregnants were tested with and without isocyanate in units that were heat cured before impregnation (C) and pressed oval units (B) under the same life test conditions as Example 1.

TABLE 2

| Impregnant System | Unit Type | % Δ C | |
|---|---|---|---|
| | | 250 hrs | 500 hrs |
| PAO + 20% ADI | C | 099 | 1.47 |
| | C | 0.80 | 1.02 |
| | B | 77.9 | — |
| Ar-PAO + 10% ADI | C | 1.05 | 1.46 |
| | C | 0.87 | 1.16 |
| | B | 2.59 | 76.6 |
| DIXE + 10% ADI | C | 0.82 | 1.09 |
| | C | 0.87 | 1.23 |
| | B | 0.43 | 0.52 |
| DIDP | C | 1.67 | 4.77 |
| | C | 1.89 | 4.84 |
| | B | 0.57 | 2.84 |
| DIOS + 20% RUP | C | 0.73 | 1.02 |
| | C | 0.55 | 0.66 |
| | B | 0.27 | 0.23 |
| DINP | C | 1.11 | 3.43 |
| | C | 1.16 | 3.31 |
| | B | 1.51 | 5.39 |

The difference in the 250 hr data between the dioctyl sebacate (DIOS) containing isocyanate above and that without any additive in Table 1 shows the beneficial effect of the isocyanate.

EXAMPLE 3

In this example, the impregnant was diisononyl phthalate (DINP) with and without isocyanate. Units that were heat cured before impregnation (C) were used throughout; test conditions were the same as Example 1.

TABLE 3

| Impregnant System | % Δ C | |
|---|---|---|
| | 250hrs | 500hrs |
| DINP | 0.96 | 1.85 |
| | 1.01 | 1.91 |
| | 1.13 | 1.98 |
| DINP + 5% RUP | 0.48 | 0.68 |
| | 0.57 | 0.68 |
| | 0.43 | 0.61 |
| DINP + 10% RUP | 0.59 | 0.79 |
| | 0.55 | 0.69 |
| | 0.60 | 0.73 |
| DINP + 20% RUP | 0.28 | 0.32 |
| | 0.20 | 0.31 |
| | 0.25 | 0.40 |
| DINP + 5% ADI | 0.39 | 0.51 |
| | 0.38 | 0.49 |
| | 0.47 | 0.69 |
| DINP + 10% ADI | 0.69 | 0.89 |
| | 0.67 | 0.89 |
| | 0.70 | 0.92 |
| DINP + 20% ADI | 0.32 | 0.39 |
| | 0.55 | 0.66 |
| | 0.60 | 0.80 |
| DINP + 10% PPI | 0.64 | 0.94 |
| | 0.51 | 0.73 |
| | 0.59 | 0.79 |
| DINP + 20% PPI | 0.20 | 0.26 |
| | 0.18 | 0.32 |
| | 0.24 | 0.32 |
| DINP + 10% MDI | 0.50 | 0.62 |
| | 0.44 | 0.54 |
| | 0.45 | 0.62 |
| DINP + 10% MDIP | 0.65 | 0.75 |
| | 0.58 | 0.77 |
| | 0.53 | 0.59 |

Again, the isocyanates improved the loss of capacitance over the base fluid.

EXAMPLE 4

In this example, diisononyl phthalate (DINP) was the impregnant in units that were not heat cured before impregnation (A) and in pressed oval units (B). Test conditions were as in Example 1.

TABLE 4

| Impregnant System | Unit Type | %ΔC | | |
|---|---|---|---|---|
| | | 250hrs | 500hrs | 1000hrs |
| DINP + 1% RUP | A | 1.8 | 2.6 | 3.56 |
| | A | 1.8 | 1.6 | 2.89 |
| | B | 0.6 | 0.9 | 1.93 |
| DINP + 2% RUP | A | 1.2 | 1.9 | 2.62 |
| | A | 1.4 | 2.1 | 2.75 |
| | B | 0.4 | 0.3 | 0.71 |
| DINP + 5% RUP | A | 1.3 | 1.9 | 2.99 |
| | A | 0.9 | 1.5 | 2.45 |
| | B | 0.4 | 0.3 | 0.48 |
| DINP + 10% RUP | A | 0.9 | 1.3 | 2.03 |
| | A | 1.1 | 1.6 | 2.35 |
| | B | 0.3 | 0.3 | 0.50 |
| DINP + 20% DPP | A | 1.6 | 2.1 | 2.94 |
| | A | 1.1 | 1.7 | 2.39 |
| | B | 0.1 | +0.1 | 0.57 |
| DINP + 20% ADI | A | 0.8 | 1.1 | 1.67 |
| | A | 1.0 | 1.5 | 2.35 |
| | B | 0.4 | 0.5 | 0.67 |

EXAMPLE 5

The groups of capacitors in this series were life tested at 415 V, 100° C., and 60 Hz. The base fluid was diisononyl phthalate (DINP), and both laboratory and plant impregnation samples were run. The units were pressed ovals (B) or heat cured after impregnation (C).

TABLE 5

| Impregnant System | Unit Type | %ΔC 250 hrs | %ΔC 500 hrs |
|---|---|---|---|
| DINP (lab) | C | 0.28 | 0.59 |
|  | C | 0.39 | 1.12 |
|  | B | 0.21 | 0.15 |
| DINP (plant) | C | 0.13 | 0.12 |
|  | C | 0.04 | 0.12 |
|  | B | 0.03 | 0.22 |
| DINP + 5% ADI | C | 0.06 | 0.37 |
|  | C | 0.10 | 0.24 |
|  | B | 0.45 | 0.03 |
| DINP + 10% ADI | C | 0.12 | 0.33 |
|  | C | 0.01 | 0.36 |
|  | B | 0.51 | 0.21 |
| DINP + 20% ADI | C | 0.03 | 0.37 |
|  | C | 0.17 | 0.26 |
|  | B | 0.44 | 0.23 |
| DINP + 10% RUP | C | +0.05 | +0.32 |
|  | C | 0 | +0.28 |
|  | B | +1.27 | +1.77 |
| DINP + 20% RUP | C | 0.04 | +0.23 |
|  | C | 0.02 | +0.25 |
|  | B | +0.01 | +0.31 |

The above shows that electrode area is not being lost, and, where there is a gain, this may be normal reading error and/or slight shrinkage of the film (since the test temperature is higher). Compared with the preceding tables, the above data also show that life tests at 415 V, 60 Hz, and 100° C. are less destructive than those at 500 V, 60 Hz, and 80° C., or that test voltage is more critical than test temperature. Where capacitance loss has been the limiting factor determining operating voltage, the use of isocyanate additives may permit higher operating voltages.

What is claimed is:

1. An AC metallized film capacitor comprising two contiguously wound aluminized polypropylene films impregnated with a dielectric fluid selected from the group consisting of ester and hydrocarbon dielectric fluids containing 1 to 20% of an isocyanate containing unreacted isocyanate groups as additive to improve AC life, said isocyanate being selected from the group consisting of a $C_{36}$-aliphatic diisocyanate, a polymethylene polyphenyl isocyanate, a diphenylmethane diisocyanate, a diphenylmethane diisocyanate prepolymer, a liquid rincinoleate urethane prepolymer, and a toluenediisocyanate-free diisocyanate prepolymer.

2. An AC capacitor according to claim 1 wherein said dielectric fluid is an ester fluid.

3. An AC capacitor according to claim 2 wherein said fluid is selected from diisononyl phthalate, dioctyl sebacate, diisodecyl phthalate, a tetraester of pentaerythritol, or an ester of tripentaerythritol.

4. An AC capacitor according to claim 3 wherein said fluid contains up to 20% diallyl phthalate.

5. An AC capacitor according to claim 1 wherein said dielectric fluid is a hydrocarbon fluid.

6. An AC capacitor according to claim 5 wherein said fluid is selected from a poly-alpha-olefin dielectric fluid, an aromatic-modified poly-alpha-olefin dielectric fluid, or dixylyl ethane.

* * * * *